2,953,570

METHOD OF MAKING HYDRAZINE DERIVATIVES

Bernard Rudner, Silver Spring, Md., assignor to W. R. Grace & Co., New York, N.Y., a corporation of Connecticut No Drawing. Filed June 13, 1957, Ser. No. 665,605

12 Claims. (Cl. 260—294.7)

This invention relates to a novel method for preparing salts of basic hydrazine derivatives in which at least one nitrogen has both of its hydrogens replaced by either two substituted carbon atoms each singly bonded to the nitrogen or one substituted carbon atom doubly bonded to the nitrogen atom. In one specific aspect, it relates to the preparation of quaternized β-hydroxyalkyl-containing hydrazinium salts and their derivatives. In another aspect, it relates to the reaction of acid salts of substituted hydrazines and oxiranes to form novel hydrazinium salts.

For a long time the useful and interesting quaternary hydrazinium salts could be prepared only on a laboratory scale. The common method of making these compounds comprised the reaction of 1,1-disubstituted hydrazines and alkylating agents, viz: methyl halides. Because of the former difficulties involved in preparing the parent hydrazines and the limitations of the final alkylation (see O. Westphal, Berichte de Deutsche Chemische Gesellschaft 74: 759 et. seq., 1365, et. seq. (1941)), the uses of the hydrazinium chlorides have been explored only to a limited extent. These various uses include commercial application as bacteriocides, detergents, polymerization initiators, catalysts, antihistaminics, anti-spasmodics, curarimimetics and a wide range of intermediates.

Unfortunately, the effectiveness of the method used by Westphal is limited primarily to the production of a variety of aliphatic hydrazinium salts, since more complex alkylating agents, e.g. the hydroxysubstituted alkylating agents, are not readily available. For example, while the simple 1,1-dimethyl-1-(2-hydroxyethyl)-hydrazinium bromide is readily obtainable from ethylene bromohydrin and 1,1-dimethylhydrazine, the homologous 1,1-dimethyl-1-(2-hydroxyoctadecyl-1) hydrazinium bromide could not be readily prepared by a similar procedure because the corresponding bromohydrin is unavailable. I have found an alternative method which produces with great facility this latter class of hydrazinium salts. In one of its aspects my new type of reaction involves treating acid salts of substituted hydrazines with oxiranes. Thus, by a simple one-step method I am able to produce in good yield a variety of hydrazinium salts of a specific type which could not be made conveniently by known methods.

It is, therefore, an object of the present invention to provide a novel method for making β-hydroxyalkyl-containing hydrazine derivatives.

Fundamentally, my invention comprises the reaction of oxiranes with acid salts of basic hydrazine derivatives in which at least one nitrogen has both of its hydrogens replaced by either two substituted carbon atoms each singly bonded to the nitrogen or one substituted carbon atom doubly bonded to the nitrogen atom. The broad scope of this new type of reaction is shown below in Equations 1, 2 and 3:

(1) 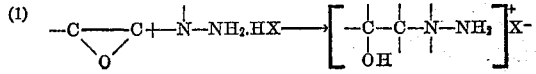

(2) 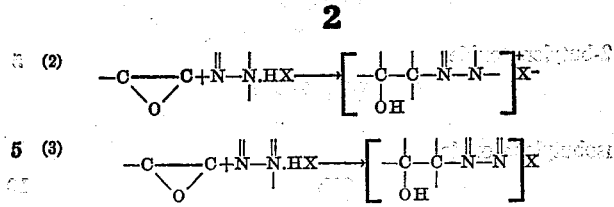

(3) 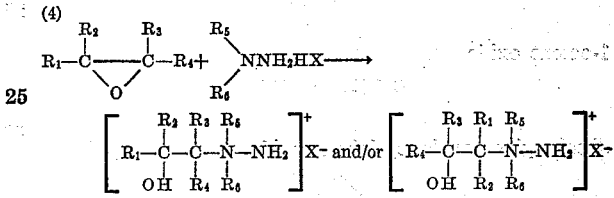

X as used in the above equations, and hereafter in the specification, may be an anion of the following types: chloride, bromide, iodide, sulfate, phosphate, nitrate, benzenesulfonate, monomethyl sulfate, monophenyl phosphate, and functionally equivalent materials. The possible substituents attached to the free bonds will become apparent from the ensuing discussion. Products made by the methods indicated above can be generically described as β-hydroxyalkylhydrazinium, hydrazonium and azinium salts. The reaction products in each case are probably a mixture of isomers. For example, in Equation 4, a reaction similar to Equation 1, the following products are obtained:

(4)

$$R_1-\underset{\underset{O}{\diagdown\diagup}}{C}\underset{R_6}{\overset{R_2}{\underset{|}{-}}}\underset{R_6}{\overset{R_3}{\underset{|}{C}}}-R_4+\ \ \underset{}{\overset{R_5}{\diagup}}NNH_2 \cdot HX \longrightarrow$$

$$\left[R_1-\underset{\underset{OH}{|}}{\overset{R_2}{\underset{|}{C}}}-\underset{\underset{R_4}{|}}{\overset{R_3}{\underset{|}{C}}}-\underset{\underset{R_6}{|}}{\overset{R_5}{\underset{|}{N}}}-NH_2\right]^+ X^- \text{ and/or } \left[R_4-\underset{\underset{OH}{|}}{\overset{R_3}{\underset{|}{C}}}-\underset{\underset{R_2}{|}}{\overset{R_1}{\underset{|}{C}}}-\underset{\underset{R_6}{|}}{\overset{R_5}{\underset{|}{N}}}-NH_2\right]^+ X^-$$

In the formulas shown in Equation 4, the values of $R_1$, $R_2$, $R_3$, $R_4$, $R_5$ and $R_6$ are these. $R_1$, $R_2$, $R_3$ and $R_4$ can be hydrogen, alkyl, cycloalkyl, aryl, and aralkyl. In addition to representing the individual substituents aforesaid, $R_1$ can be a carbon-containing residue which is taken collectively with $R_2$ or $R_3$ to form mono or bicyclic carbon ring structures having no more than 7 annular members in a ring, for example, vinylcyclohexene dioxide. $R_5$ and $R_6$ can be lower alkyl, hydroxyl lower alkyl or carbon-containing residues which when taken collectively with each other represent the necessary atoms to complete a heterocyclic ring structure having at least 5 and not more than 7 endocyclic atoms, e.g., a pyrrolidino, morpholino, or heptamethylenimino residue. When $R_6$ is lower alkyl, $R_5$ can be a benzene, nitrobenzene, or chlorobenzene residue. X has the values indicated aforesaid in Equations 1, 2 and 3.

I have previously mentioned that the reaction of Equation 4 involves the use of oxiranes, commonly referred to as olefin oxides, epoxides or epoxy compounds. These readily available compounds are highly reactive liquids or solids. The most common of the oxiranes, ethylene oxide, is made in quantities of thousands of tons per year for use in making detergents, glycols, waxes and the like. Commercially, the oxiranes are prepared generally by the oxidation of an olefin, e.g. either in air in the presence of silver catalyst or with a peracid such as peracetic acid. The Darzens reaction also affords a simple way of making certain other oxiranes, as illustrated in Equation 5. Values of $R_1$, $R_2$, $R_3$ and $R_4$ are those indicated aforesaid in connection with Equation 4.

(5) 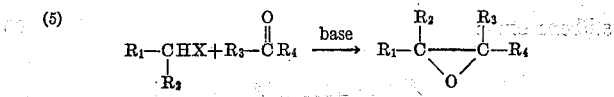

Typical useful oxiranes for the purpose of my invention include, but are not limited to, ethylene oxide propylene oxide

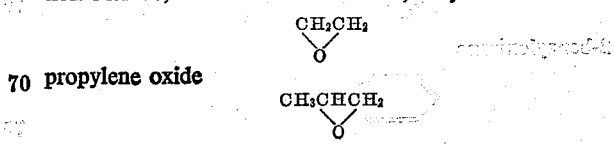

1-butylene oxide

CH₃CH₂CHCH₂
       \O/

2-butylene oxide

CH₃CHCH—CH₃
    \O/ isobutylene oxide

CH₃
       |
CH₃C———CH₃
    \O/

2-vinylethylene oxide (2-vinyloxirane)

CH₂=CH—CHCH₂
         \O/ butadiene dioxide

CH₂CHCHCH₂
 \O/ \O/

2,2,3,3-tetramethylethylene oxide,

CH₃  CH₃
    |    |
CH₃—C———C—CH₃
     \O/

1-octene oxide

CH₃(CH₂)₅CHCH₂
          \O/ diisobutylene oxide, cyclohene oxide

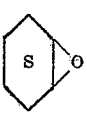

(3-cyclohexenyl) oxirane

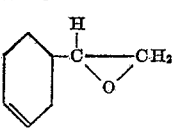

4-vinylcyclohexene oxide

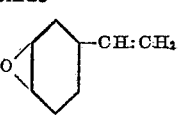

vinylcyclohexene dioxide

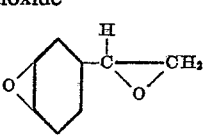

α-pinene oxide, dodecene 2,3-oxide

CH₃(CH₂)₈—CH———CH—CH₃
            \O/ mixed octadecene oxides C₈H₁₆O, styrene oxide

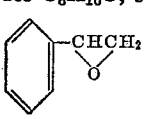

stilbene oxide

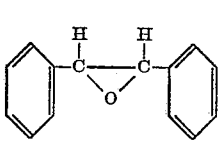

2-benzyloxirane

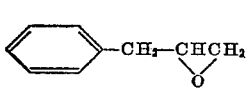

glycidol, epichlorohydrin, glycidic acid, ethyl glycidate, butyl epoxyoleate, epoxidized glyceryl trioleate, 2-(m-nitrophenyl)oxirane, 2-benzoyl-3-phenyloxirane

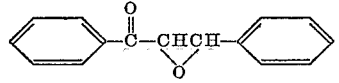

4-trifluoromethylstyrene oxide

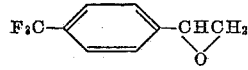

tetrahydroxybutylethylene oxide

H
                |
HOCH₂(CHOH)₃—C———CH₂
              \O/ glyceryl triepoxyricinoleate, and the like. Obviously, the above list is intended to be merely illustrative rather than all inclusive.

The acid salts of substituted hydrazines may be readily prepared according to the technique shown in great detail in Example 1. Generally the method involves treating the selected hydrazine cautiously with the acid which will provide the particular acid salt desired with good stirring or refluxing. The product may be purified using standard laboratory methods. Substituted hydrazines may now be readily prepared by the method described by A. D. Kelmers in his PhD thesis submitted to the Ohio State University (1954). The Kelmers' technique involves treating a primary or secondary amine with chloramine under anhydrous conditions to produce the desired substituted hydrazine. This method has contributed greatly to the availability of these compounds.

The essential limitations on the choice of substituted hydrazine for my reaction are two. First, the effects of steric hindrance in retarding the reaction of the oxirane with the hydrazine salt increase where branch chains and cyclic radicals are attached to the nitrogen where the reaction with the oxirane occurs. As the steric effect increases, the amount of quaternized product which can be obtained by treatment with oxirane declines. Very little, if any, of the desired reaction product is obtained when tertiary carbon atoms are attached directly to the reactive nitrogen. Likewise, hydrazine derivatives having more than one cyclic group attached univalently directly to one of the nitrogens exhibit relatively little affinity toward the oxirane. A sterically hindered N,N-dialkyl hydrazine shows the following reaction:

(6) 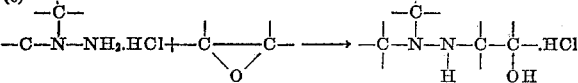

Steric effects are obvious to the skilled organic chemist, although it is difficult to draw a line with mathematical exactness which would exclude hydrazine salts which are inoperative for the purposes of the present invention. A proper limitation, however, takes due cognizance of the judgement of skilled chemists. It is sufficient to say that where the nitrogens of the substituted hydrazine are blocked by steric effects to the point at which an oxirane will no longer attach thereon, hydrazines of such structure are unsuitable.

The more basic nitrogen or the hydrazine, which acts as the cationic center, will be attacked by the oxirane if steric factors do not prevent such an attack. The desired attack is achieved when alkyl, hydroxyalkyl, and carbon-containing residues which unite to form a ring are the substituents of the nitrogen which is the cationic center. On the other hand, if the substituted nitrogen contains aryl or acyl groups the basicity of that nitrogen is reduced and the oxirane will tend to attack the amino group (the nitrogen having two hydrogen atoms attached thereto). In spite of this fact, monoacyl or monoaryl substituted hydrazine salts will react to some extent with oxiranes to produce hydrazinium salts.

When my novel type of reaction is considered in its broad sense, the problem of basicity becomes increasingly acute. Hydrazones are less basic than hydrazines and azines are less basic than hydrazones. In the latter case, compounds such as benzaldehyde azine, which is not capable of forming a stable HX salt, represents about the limit in choice of reactant.

Suitable hydrazine derivatives for the purpose of the present invention include 1,1-dimethylhydrazine $(CH_3)_2NNH_2$;

1,1,2-trimethylhydrazine $(CH_3)_2NNHCH_3$;

1,1,2,2-tetramethylhydrazine $(CH_3)_2NN(CH_3)_2$;

1-ethyl-1-methylhydrazine $CH_3NC_2H_5NH_2$;

1,1-diethyl-2-acetylhydrazine $$(C_2H_5)_2NNH\overset{O}{\underset{\|}{C}}CH_3$$

1,1-dimethylsemicarbazide $(CH_3)_2NNHCONH_2$;

1-allyl-1-benzylhydrazine $$CH_2:CHCH_2NNH_2$$
$$|$$
$$CH_2C_6H_5$$

1-ethyl-1-phenethylhydrazine $$C_6H_5CH_2CH_2NNH_2$$
$$|$$
$$C_2H_5$$

1-methyl-1-phenylhydrazine $$C_6H_5NNH_2$$
$$|$$
$$CH_3$$

1-cyclohexyl-1-ethylhydrazine $$C_6H_{11}NNH_2$$
$$|$$
$$C_2H_5$$

1-aminopyrrolidine $$\begin{matrix} CH_2CH_2 \\ | \quad\quad \diagdown \\ \quad\quad\quad N\text{---}NH_2 \\ | \quad\quad \diagup \\ CH_2CH_2 \end{matrix}$$

4-aminomorpholine $$\begin{matrix} \quad\quad CH_2CH_2 \\ \diagup \quad\quad\quad \diagdown \\ O \quad\quad\quad\quad N\text{---}NH_2 \\ \diagdown \quad\quad\quad \diagup \\ \quad\quad CH_2CH_2 \end{matrix}$$

1-aminopiperidine $$\begin{matrix} \quad\quad CH_2CH_2 \\ \diagup \quad\quad\quad \diagdown \\ CH_2 \quad\quad\quad N\text{---}NH_2 \\ \diagdown \quad\quad\quad \diagup \\ \quad\quad CH_2CH_2 \end{matrix}$$

1-amino-4-phenylpiperazine $$\begin{matrix} \quad\quad CH_2CH_2 \\ \diagup \quad\quad\quad \diagdown \\ H_2NN \quad\quad\quad N\text{---}C_6H_5 \\ \diagdown \quad\quad\quad \diagup \\ \quad\quad CH_2CH_2 \end{matrix}$$

1,4-diamino-2-methylpiperazine $$\begin{matrix} \quad\quad CH_3 \\ \quad\quad | \\ \quad\quad CH_2CH \\ \diagup \quad\quad\quad \diagdown \\ H_2NN \quad\quad\quad NNH_2 \\ \diagdown \quad\quad\quad \diagup \\ \quad\quad CH_2CH_2 \end{matrix}$$

1-amino-4-benzoylpiperazine $$\begin{matrix} \quad\quad CH_2CH_2 \quad\quad O \\ \diagup \quad\quad\quad \diagdown \quad\quad \| \\ H_2NN \quad\quad\quad N\text{---}CC_6H_5 \\ \diagdown \quad\quad\quad \diagup \\ \quad\quad CH_2CH_2 \end{matrix}$$

1-aminoperhydroindole $$\begin{matrix} \quad\quad\quad\quad CH_2 \\ \diagup\!\!\diagdown\!\!\diagup \quad\diagdown \\ | \quad\quad | \quad\quad CH_2 \\ \diagdown\!\!\diagup\!\!\diagdown \quad\diagup \\ \quad\quad\quad N \\ \quad\quad\quad | \\ \quad\quad\quad NH_2 \end{matrix}$$

2-methyl-1-phenyl 5-pyrazolidone $$\begin{matrix} O \\ \diagdown \\ \quad C\text{---}CH_2 \\ C_6H_5N \quad\quad\quad \\ \diagdown \quad\quad\quad \diagup \\ \quad\quad N\text{---}CH_2 \\ \quad\quad | \\ \quad\quad CH_3 \end{matrix}$$

acetaldehyde semicarbazone $$CH_3CH:NNH\overset{O}{\underset{\|}{C}}NH_2$$

acetone phenylhydrazone $(CH_3)_2C:NNHC_6H_5$; methylethylketone 2,4-dinitrophenylhydrazone $$C_2H_5C=NNHC_6H_3(NO_2)_2$$
$$|$$
$$CH_3$$

N-cyclohexylidenebenzhydrazide $$\begin{matrix} \quad\quad CH_2CH_2 \quad\quad\quad O \\ \diagup \quad\quad\quad \diagdown \quad\quad\quad \| \\ CH_2 \quad\quad\quad C:NNHCC_6H_5 \\ \diagdown \quad\quad\quad \diagup \\ \quad\quad CH_2CH_2 \end{matrix}$$

cyclohexylidene acetylidene azine $$\begin{matrix} \diagup\!\!\diagdown \\ | \quad | =N\text{---}N=CHCH_3 \\ \diagdown\!\!\diagup \end{matrix}$$

β-methoxypropionaldehyde azine $$(CH_3OCH_2CH_2CH:N)_2$$

benzaldazine $$\left(\!\!\left\langle\!\!\bigcirc\!\!\right\rangle\!\!CH:N\right)_2$$

diethylketone azine $[(C_2H_5)_2C:N\text{---}]_2$; propylidene 2-acetylhydrazone $$CH_3CH_2CH:NNH\overset{}{\underset{\underset{O}{\|}}{C}}CH_3$$

and the like.

The possible variations of the anion X have been fully described hereabove. It is sufficient to say that HX must be capable of splitting the oxirane ring by simple addition and the additive thus formed must be capable of reacting with a hydrazine derivative. The overall mechanism is possibly similar to Equations 7 and 8 shown hereunder.

(7)
$$\begin{matrix} | \quad | \\ -C\text{---}C\text{---} \\ \diagdown\!\!\diagup \\ O \end{matrix} + \begin{matrix} | \quad | \\ -N\text{---}N\text{---}\cdot HX \end{matrix} \longrightarrow \begin{matrix} | \quad | \quad\quad | \quad | \\ -C\text{---}C\text{---}\!\!\text{---}\!\!N\text{---}N\text{---} \\ | \quad | \\ OH \quad X \end{matrix}$$

(8)
$$\begin{matrix} | \quad | \quad\quad | \\ -C\text{---}C\text{---}\!\!\text{---}\!\!N\text{---}N\text{---} \\ | \quad | \\ OH \quad X \end{matrix} \longrightarrow \left[\begin{matrix} | \quad | \quad\quad | \quad | \\ -C\text{---}C\text{---}N\text{---}N\text{---} \\ | \\ OH \end{matrix}\right]^{+}X^{-}$$

Since my novel reaction is very much faster than that of the simple alkylation of Equation 8, it is obviously not a mere sequence of Equations 7 and 8. Instead, it appears more likely that the first step of my novel reaction involves the formation of an oxonium complex of the hydrazine; viz:

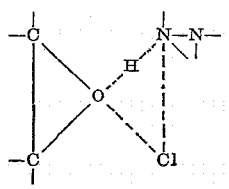

or

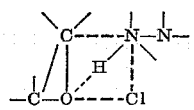

The ratio of oxirane to hydrazine salt used for the purposes of my new reaction is governed to a measurable extent by the required purity of the product. If a large excess of oxirane is used a further reaction will result in the formation of polyoxyalkyl hydrazinium salts. For detergent and polymer work such a result is not wholly undesirable. However, in preparing pharmaceutical and drug intermediates the desired result is a single, easily purifiable product. For these purposes the mole ratio of oxirane to hydrazine salt should be limited to less than about 0.95. The limitation is not critical when treating solutions of the hydrazine salt with an oxirane in the vapor phase at atmospheric pressure without condensation. In this instance an excess of the oxirane should be used to obtain a workable yield.

My reaction is adaptable, depending of course on the nature of the reactants, to gas-liquid, liquid-liquid, gas-solid, liquid-solid reactions. It works effectively using both anhydrous and aqueous solutions. A solvent is usually desirable if the oxirane or hydrazine salt is not liquefiable, or if the hydrazine salt is too expensive to warrant its use as its own solvent.

The wide range of solvents applicable to my novel reaction includes hydrocarbons, e.g. heptane, cyclohexane, benzene, xylene and the like; ethers, e.g. diethyl ether, diamyl ether, dioxane and anisole; amides, e.g. dimethylformamide and dimethylacetamide; halohydrocarbons, e.g. chloroform, carbon tetrachloride, trichloroethylene, and chlorobenzene; and nitroaromatics, e.g. nitrobenzene. Hydroxylic solvents such as water and polar, at least partially water soluble, organic solvents, e.g., lower alcohols and ethoxyethanol, are especially useful. In general, the more polar the solvent the better the reaction proceeds. However, although water is highly polar and a good solvent, it may tend to react with more reactive oxiranes. Again, while nitrobenzene is more polar than benzene, it reacts at higher temperatures with the hydrazines. Unreactive polar liquids capable of dissolving both reactants are most desirable, but it is also possible to use an inert liquid solvent, e.g., mineral oil, as a reaction medium providing there is a good contact maintained between the reactants. It is obvious to the trained organic chemist that many other solvents would be equally suitable as reaction media.

Practical, rather than theoretical, limits control the reaction temperature. Thus, ethylene oxide will react, although slowly, even below 0° C. Extremely elevated temperatures favor complicated side reactions such as further oxyalkylation and dehydration. Thus, the temperature depends upon the nature of the desired product (i.e. mono-oxyalkylated or polyoxyalkylated) the reactivity of the oxirane and to a lesser extent the reactivity of the hydrazine salt. In general a temperature range of about 20–200° C. is satisfactory. Volatile oxiranes should be reacted at temperatures within the lower portion of the range.

Pressure control is again a matter of convenience rather than necessity. Preferable pressure conditions are those at or very slightly above atmospheric pressure; although the allowable maximum extends upwardly therefrom and is controlled to a large extent to the type of equipment used. When more sterically hindered oxiranes are used as reactants, increased pressures up to about 100 p.s.i. are advantageous.

The time required to complete the oxirane-hydrazine salt reaction is dependent on the aforementioned factors, thoroughness of contact, and intrinsic process variations apparent to one skilled in the art. A highly reactive oxirane will react with an unhindered hydrazine salt at elevated temperatures in a few minutes. On the other hand, an unreactive oxirane may require several hours to react with a sterically hindered hydrazine salt. The reaction time is conveniently measured by following the rate disappearance of one of the components, e.g., the oxirane (by titration) or the hydrazine salt (by alkaline steam distillation and iodometric titration). Once this is done, it is easy to establish a practical reaction time per unit batch of affixed reactants.

The reaction of oxiranes with hydrazones or azines are shown below in Equations 9 and 10.

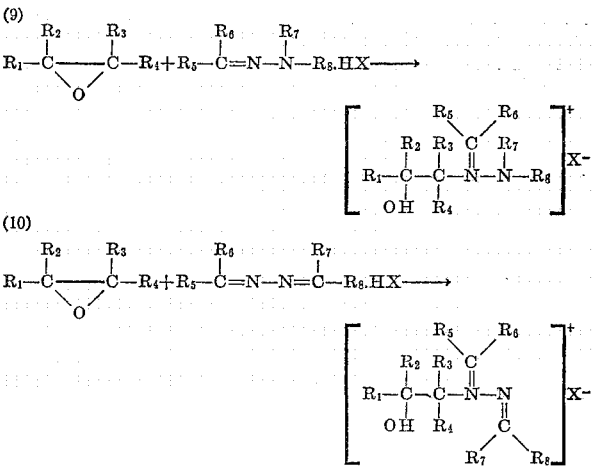

The values for the R substituents shown above are these: For the hydrazone formation (Equation 9) the values of $R_1$, $R_2$, $R_3$, and $R_4$ are the same as those shown for the hydrazinium salts in Equation 4. In addition, $R_5$ is hydrogen, loweralkyl, or a carbon-containing residue which may be taken collectively with $R_6$ to complete a ring structure having at least 5 and not more than 6 annular carbon atoms. $R_6$ as an individual substituent is an alkyl radical of not more than 18 carbon atoms, phenyl, p-tolyl and benzyl. $R_7$ is a hydrogen, an acyl group containing less than 8 carbon atoms, carbamoyl, thiocarbamoyl, benzyl, phenyl, mono and dinitrophenyl, halophenyl, sulfophenyl, and naphthyl. $R_8$ is a hydrogen and benzyl. For the azines (Equation 10) $R_1$, $R_2$, $R_3$, $R_4$, $R_5$ and $R_6$ have the values shown above for the hydrazones. $R_7$ and $R_8$ have the same values as $R_5$ and $R_6$.

The scope and utility of my invention is further illustrated by the following examples:

*Example 1*

A 120 g. portion of freshly distilled dimethylhydrazine (equivalent to 2 moles) was cautiously added with good stirring to 500 ml. chilled concentrated hydrochloric acid (a 5 mole equivalent) over a period of one hour. The reaction mixture was stirred to room temperature, then evaporated dry at 12 mm. Hg. When it was observed that the flask lost no further weight on vacuum evaporation, 500 ml. of mixed xylenes were added thereto. Using a Dean-Stark trap, the mixture of liquids was azeotropically distilled for 24 hours. Water had ceased to be distilled over about 8 hours before the distillation was discontinued. The resulting mixture was cooled and the xylene was decanted off. Vacuum drying at 2 mm. Hg gave 161 g. of a slightly yellow viscous oil which, on being seeded, yielded almost white crystals of dimethylhydrazine hydrochloride. The product was identified by conversion to its oxalate.

Example II

A 9.7 g. portion of the product of Example I in 70 ml. of refluxing ethyl alcohol was treated over a period of approximately 30 minutes with a total of 5 g. ethylene oxide as a gas bubbled through the solution. Refluxing was continued for an additional 30 minutes; the solvent was then stripped off in vacuo. The viscous tan oil remaining weighed 12.2 g. It was washed with diethyl ether, then vacuum dried. This treatment failed to produce crystals. The material was then recrystallized twice from a solvent mixture containing two parts ethyl acetate to one part ethyl alcohol. The resulting product appeared as highly hygroscopic off-white needles which melted at 157 to 158° C., representing analytically pure 1,1-dimethyl-1-(2-hydroxyethyl) hydrazinium chloride. For purposes of identification it was converted to a picrate melting at 169° C. The novel product was found to be soluble in water and ethyl alcohol. It showed some solubility in acetone. The preparative reaction is shown below in Equation 11.

(11)

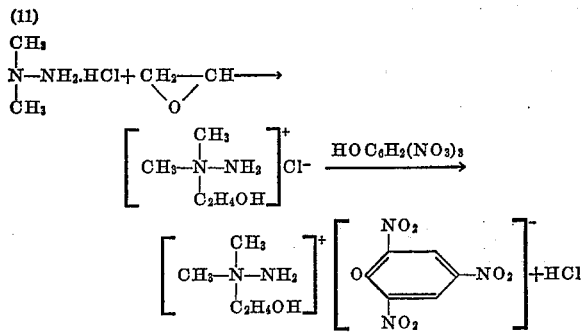

Example III

A portion of freshly distilled diethylhydrazine was converted to its HBr salt by a procedure substantially similar to that of Example I. A 73% yield of diethylhydrazine hydrobromide was obtained thereby.

Example IV

The procedure of Example II was substantially duplicated, treating the product of Example III with ethylene oxide in water at 80° C. on a steam bath. The aqueous solution was cooled, extracted twice with benzene, then made weakly alkaline with sodium carbonate. The mixture was re-extracted and then vacuum dried. Recrystallization of the pasty brown residue from ethyl acetate was repeated three times to give 92% pure 1,1-diethyl-1-(2-hydroxyethyl) hydrazinium bromide. The product appeared as off-white crystals which decomposed at about 191° C. When treated with picric acid it formed a salt melting at 179–179.5° C. after recrystallization.

Example V

The reactants of Example II were allowed to react under the modified conditions of Example IV to give as a product a supercooled oil representing about an 85% yield of 1,1-dimethyl-1-(2-hydroxyethyl) hydrazinium chloride.

Example VI

A 9.7 g. portion (representing 0.1 mole) of dimethylhydrazine hydrochloride was added to 100 ml. of refluxing absolute ethyl alcohol. Ethylene oxide was then added as a gas to this solution for a period of one hour. A total of 9.6 g. (0.22 mole) of ethylene oxide was added during that period. The mixture was refluxed for two hours and was stripped free of solvent. The 18.6 g. of residue were dissolved in water; the pH of this solution was then adjusted to 8–8.5 with sodium carbonate. This solution was extracted with chloroform and no dimethylhydrazine appeared in the organic extract. The solution was then evaporated to dryness and extracted with three 100 ml. portions of isopropyl alcohol which had been previously dried over anhydrous magnesium sulfate. The extract was then evaporated dry in vacuo to give 17.1 g. of a thick tan oil representing crude

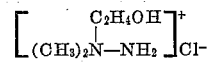

The product was extracted with diethylether and thereafter precipitated from ethyl alcohol with methyl isobutyl ketone. On vacuum drying 14.1 g. of a white semi-solid was obtained. By analysis it appeared to be a mixture of the above product and high oxyethylated derivatives, apparently

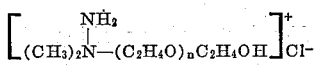

Extraction of the dried product with anhydrous peroxide-free dioxane gave us the more soluble fraction a hygroscopic thick oil. The oily nature of the ultimate product suggested that it was rich in

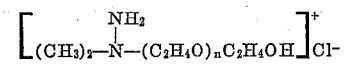

Example VII

A solution of 6.7 g. of 1,1-dimethylhydrazine (0.1 mole of 90% pure base) in 500 ml. dry peroxide-free diethyl ether was saturated for one-half hour at −10° C. with dry HCl. It was sealed and refrigerated for forty-eight hours. The semi-solid residue obtained therefrom by decantation was washed by decantation with absolute, peroxide-free, diethyl ether and vacuum dried to give a 98% yield of dimethylhydrazine hydrochloride. This material was refluxed in 100 ml. of isopropyl alcohol and then treated with a slow stream containing a 1:3 molar mixture of ethylene oxide and nitrogen. A total of 4.8 g. of $C_2H_4O$ (0.11 mole) was added over a period of 30 minutes. The mixture was refluxed for 30 minutes and allowed to cool to room temperature. It was refrigerated over night and a solid mixture of product and unreacted hydrochloride was obtained therefrom by filtration. The salt and the filtrate were poured into 200 ml. of 5% sodium bicarbonate solution, and evacuated dry in vacuum at 40 to 50° C. The residue was extracted with isopropyl alcohol. Crude

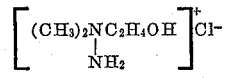

was obtained on adding ether. The product was recrystallized from ethyl acetate to give the highly hygroscopic pure hydrazinium chloride in good yield.

Example VIII

A quantity of N-aminomorpholine was prepared by the procedure of Knorr and Brownsdon Ber. 35, 4477 (1902). The anhydrous hydrochloride of this material was prepared and treated in a manner similar to that of Example VII. An 0.01 mole portion of the hydrochloride in 30 ml. of isopropyl alcohol was reacted at 0 to 10° C. with 0.01 mole ethylene oxide as a gaseous mixture. The resulting mixture was stirred continuously for 2 hours and then allowed to warm to room temperature. It was thereafter refluxed for 30 minutes and the solvent was stripped off in vacuo. Using the work-up procedure described in Example VII, a good yield of the product, 4-amino-4-(2-hydroxyethyl)morpholinium chloride, having a M.P. of 152–53° C., was obtained.

Example IX

N-aminopiperidine, a light brown basic oil with an unpleasant smell, was prepared by a procedure substantially the same as that used for making N-aminomorpholine, supra. Ten grams of the N-aminopiperidine were dissolved in 100 ml. of dry dioxane. This solution was kept at 12 to 15° C. and treated with saturated dry HCl gas. A suspension of the hydrochloride thus formed was held at 80° C. with good agitation for a 30-minute period to remove most of the excess HCl. While keeping the temperature constant, 8.8 g. of glycidol were added dropwise to a refluxing solution of the hydrochloride for a period of 30 minutes. The reaction mixture was stirred for 20 minutes after addition of the glycidol and refluxed for two additional hours. It was chilled over night, then filtered at 15° C. to give as a product highly hygroscopic crude tan 1-amino-1-(2,3-dihydroxypropyl) piperidinium chloride. This interesting product melted at 176 to 178° C. It did not form a hexafluophosphate salt. Equation 12 shows the preparative reaction:

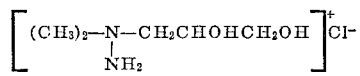

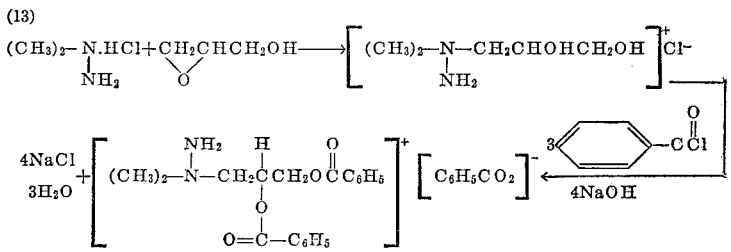

Example X

The similar reaction of glycidol with dimethylhydrazine hydrochloride gave a highly hygroscopic thick oil, $$\left[ (CH_3)_2 - \underset{NH_2}{N} - CH_2CHOHCH_2OH \right]^+ Cl^-$$

which failed to give a $PF_6^-$ or picrate precipitate from aqueous solution. Reaction of the oily product with excess benzoyl chloride by a Schotten-Baumann reaction gave a tribenzoate melting at 89 to 91° C. The reaction sequence appears hereunder:

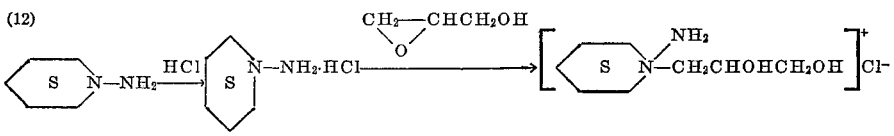

Example XI

A quantity of 1-methyl-1-(2-hydroxyethyl)hydrazine was prepared essentially according to the teachings of Benoit (Bull. Soc. Chimique, France 1947, p. 242). Evaporation of this material from an aqueous solution containing one equivalent of sulfuric acid per equivalent of hydrazine gave on vacuum drying the sulfate as an off-white powder. A 0.1 mole portion of this powder in 100 ml. of refluxing isopropyl alcohol was treated with 0.11 mole of gaseous ethylene oxide in the manner described in the preceding examples. The reaction mixture was evaporated to dryness. The residue, suspended in water, was boiled for two hours with an equivalent of barium chloride and allowed to cool. The barium sulfate thus formed was filtered off. An aqueous solution of the reaction product was charcoaled and evaporated dry to give a thick hygroscopic oil, crude 1,1-bis(2-hydroxyethyl)1-methylhydrazinium chloride. The product was purified by precipitation from ethyl alcohol with dioxane. The purified oil reacts with benzoyl chloride to give a benzoyl derivative melting from 166–166.5° C. The preparative reaction is shown hereunder in Equation 14.

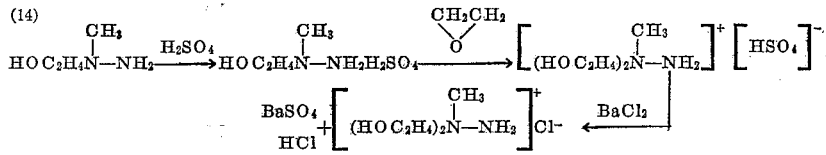

Example XII

A 9.2 g. portion of freshly distilled methylhydrazine was reacted with 12 g. of benzyl chloride and 250 ml. of diethyl ether at 15–20° C. for a period of two weeks. The reaction mixture was washed with water and dried for two hours over anhydrous magnesium sulfate. The resulting solution was saturated at 10–15° C. with dry HCl to give approximately a 30% yield of 1-methyl-1-benzylhydrazine hydrochloride

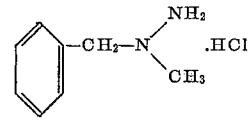

decomposing at about 200° C. The hydrochloride, 1 g., was mixed with three equivalents of styrene oxide in a small test-tube with constant stirring. The temperature of the mixture was slowly increased to about 100° C., using a water bath. The mixture was maintained at this temperature with occasional stirring for two hours. The resulting brown mass was allowed to cool, then washed by decantation with ethyl ether. It was suspended in water and the pH thereof was adjusted to 8.5 with sodium carbonate. This basic mixture was then extracted three times with equal volumes of benzene. The benzene extracts contained appreciable quantities of organic base which, when treated with HCl, formed a hydrochloride melting at 161–163° C. The aqueous layer and associated solids were evaporated dry in vacuo and the residual brown mixture of oil and solid was extracted with isopropyl alcohol. Evaporation of that extract gave crude 1-benzyl-1-methyl-1-(2-hydroxy-2-phenylethyl)hydrazinium chloride, melting at 186–189° C. with decomposition. Recrystallization from ethyl acetate gave brown plates which melted at 191–193° C. It is of course possible, although less likely, that a portion of the product was the isomeric 1-benzyl-1-methyl-1(2-hydroxy-1-phenylethyl) hydrazinium chloride. See the preparative reaction of Equation 15:

(15) 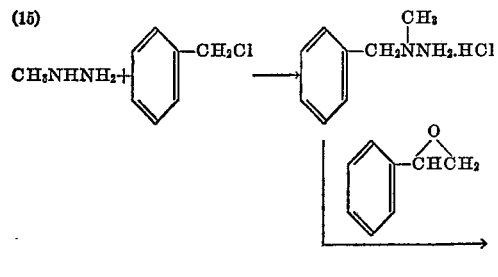 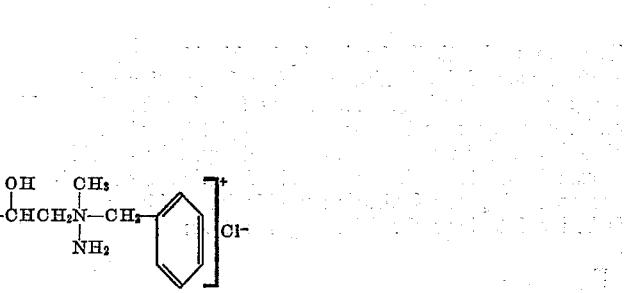

Example XIII

A 24 g. portion of styrene oxide, 24 g. of benzylphenylhydrazine hydrochloride and 1 drop of gamma collidine were heated to 80–90° C. This mixture gave an exothermic reaction which caused the temperature to rise to 140° C. It was cooled to 105° C. and kept at this temperature for 3 hours. During this time the viscosity noticeably increased. Extraction of the cooled semi-solid with 200 ml. of benzene in 4 portons left a crude benzene-insoluble residue which had a melting point of 40° C. and decomposed at 85° C. Extraction of this solid with water followed by subsequent evaporation, gave a hygroscopic white product having a melting point of 62° C., presumably 1-phenyl-1-benzyl-1-[(2-hydroxy-2-phenyl)ethyl]hydrazinium chloride.

This novel compound was soluble in water, it was not precipitated by caustic addition. It contained ionic chlorine, and in alkaline solution readily reduced large quantities of $KMnO_4$.

Example XIV

Repetition of the procedure of Example XIII using 1,1-dimethylhydrazine hydrochloride gave as a product, 1,1-dimethyl-1-[(2-hydroxy - 2-phenyl)ethyl] - hydrazinium chloride in a better yield than the product of the previous example. This new compound was a highly hygroscopic yellow solid. After recrystallization from ethyl acetate, it melted at 146–148° C.

Example XV

A 0.05 mole portion of dimethylhydrazine hydrochloride was mixed with an equal molar quantity of 1,2-diisobutylene oxide in a large test-tube and held in a boiling-water bath over night. The cooled brown mixture was triturated well with diethyl ether and hexane and washed by decantation. The washed mixture was slurried with water containing sodium carbonate to adjust the pH to 8–8.5. The mixture was then reextracted with hexane; the extract was discarded. After evaporating the water from the residual mixture, it was taken up in chloroform, washed, dried, and reevaporated to give crude 1,1-dimethyl-1(2,4,4-trimethyl-2 - hydroxyamyl)hydrazinium chloride, a super-cooled oil which was not completely solidified on seeding. The oil was purified by precipitation from isopropyl alcohol with ethyl ether. It was found to be soluble in chloroform, and quite soluble in water, ethanol and acetone.

Example XVI

The procedure of Example XV was substantially repeated using vinylcyclohexane dioxide, made by epoxidation of 4-vinylcyclohexene, as a reactant. The reaction mixture was exceedingly complex. From the water-soluble, ethyl acetate-insoluble portion was obtained a highly hygroscopic oil, the reactions of which indicated that it was a mixture of

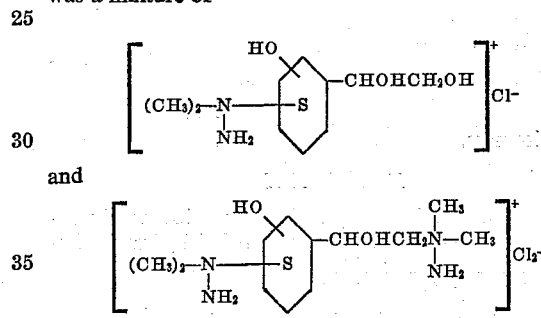

and

A soft paste was obtained from the water-soluble, ethyl-acetate-soluble oily fraction by ether extraction. This somewhat hygroscopic material is believed to be a polymer containing combined hydrazinium hydrochloride residues, possibly of the structure shown below

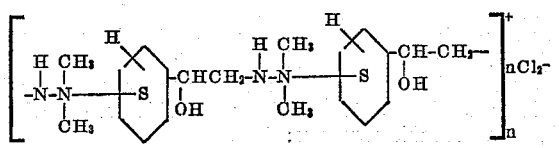

Example XVII

The procedure of Example XV was substantially repeated using a commercially available mixture consisting of approximately 90% pure epoxides of the formula

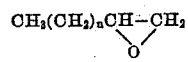

in which $n$ is 13 and 15 in approximately a 6:4 weight ratio. The hydrazinium chloride thus obtained was dispersible in water, soluble in chloroform and somewhat soluble in acetone and ethyl acetate. It was soluble to a lesser degree in ether, and relatively insoluble in cold hexane and benzene. Physically it appeared as a soft waxy semi-solid that melted clear at about 53–55° C. It was primarily a mixture of 1,1-dimethyl-1-(2-hydroxyhexadecyl)hydrazinium chloride and the corresponding octadecyl homolog. In water the novel product mixture exhibits excellent foaming and emulsifying properties.

Example XVIII

The procedure of Example XV was substantially repeated using a technical grade dioxirane available commercially as "Diepoxy Ester #1" considered to be primarily:

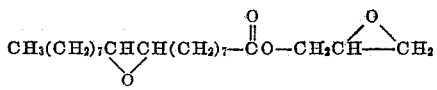

Two parts dimethylhydrazine hydrochloride were used per one part of the dioxirane. After the reaction period was over, the resulting mixture was found to be almost entirely water soluble. It was completely soluble in chloroform and xylene. From the diethyl ether-soluble, hexane-insoluble portion was obtained a mixture of product containing one hydrazinium chloride residue which is believed to have the following structure:

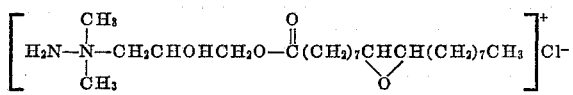

From the ether-insoluble, ethyl acetate-soluble portion was obtained a mixture containing:

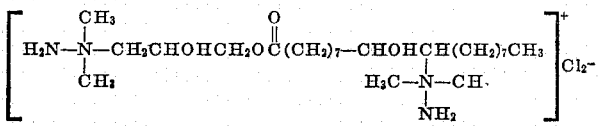

and its isomers.

Example XIX

The procedure of Example XV was substantially repeated using three equivalents of dimethyl hydrazine hydrochloride and a glyceride commercially available as "Epoxy Acetoxy Stearin." This reactant appears as a bright mobile liquid having as its major active ingredient the glyceryl tri-ester of acetoxyepoxystearic acid. It is presumably obtainable from the reaction of peracetic acid with the glyceryl tri-ricinoleate of castor oil. The crude thick brown oil obtained after the reaction was water insoluble, but completely soluble in chloroform. After being washed well with water and vacuum dried, it was found by analysis to contain 0.3% oxirane (equivalent to approximately 90% reaction) and a chloride equivalent weight of 479. The calculated value for the equivalent weight of a trishydrazinium chloride was 403.8. On this basis, the product appears to be an unresolvable mixture of bis and trishydrazinium chlorides, one of which has the probable structure:

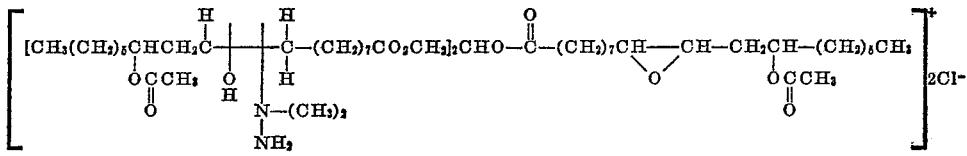

Example XX

A 0.05 mole portion of acetaldehyde phenylhydrazone and an equimolar quantity of benzyloxirane were refluxed in 40 ml. dioxane. The mixture was saturated with dry HCl for 15 minutes and then refluxed for an additional 30 minutes. It was cooled to 15–20° C. and allowed to stand over night. Filtration gave crude yellowish brown 2-phenyl-1-acetylidene-1-(2-hydroxy - 3 - phenylpropyl) hydrazonium chloride. This new product melted at about 206° C. with decomposition. It was soluble in chloroform, but poorly soluble in water. Suspension in water engendered a small amount of $CH_3CHO$ and a change in form of solid to a rapidly air-oxidizable substance. Boiling with strong HCl gave no phenylhydrazine hydrochloride as shown by the failure of the sensitive dimethylaminobenzaldehyde test. The structure of the new product is shown below:

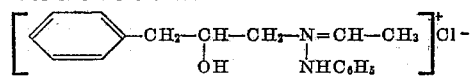

Example XXI

A 0.05 mole quantity of acetone azine and a 0.1 mole quantity of propylene oxide were dissolved in benzene and cautiously treated dropwise with 10 ml. of an anhydrous dioxane solution containing 0.05 mole of dry HBr. The reaction mixture was refluxed for 30 minutes, cooled and filtered to give a poor yield of 1,2-bis-(isopropylidene-1-β-hydroxypropyl)azinium bromide which decomposed at about 211° C. The new product was readily hydrolyzed by water to acetone and (2-hydroxypropyl)hydrazine hydrobromide. Its structural formula is shown hereunder:

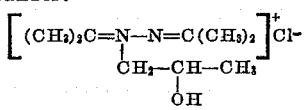

My new reaction affords a quicker, more convenient method of making hydroxyalkyl hydrazinium salts than the standard alkylation technique known to the prior art. I have already indicated that the variety of alkylating agents available for use in the prior art process is somewhat limited. Moreover, by that process there are numerous possibilities of competing side reactions which preclude obtaining high yields of the desired product. Because of such side reactions, more complex work-up and purification procedures are required. My new reaction is relatively clean; viz: there is little danger of undesirable side reactions. Furthermore, it is more adaptable to producing compounds of high molecular weight and compounds containing negatively substituted alkyl groups, e.g. cyano, carbonyl, carboxy, nitro, sulfonyl, and phosphonyl-containing alkyl groups.

The use of oxiranes as a reactant makes available a greater variety of ultimate products. For example, there are no other alkylating agents corresponding to the anhydro sugars or cyclohexylspirooxirane.

This application is a continuation in part of my co-pending application S.N. 640,584 filed February 18, 1957, now U.S. Patent No. 2,899,424. In that application I described certain novel compounds useful as intermediates for making pharmacologically active hydrozinium salts. These intermediates are easily made by the process of the present invention. The pharmaceuticals derived from them are frequently used in pharmacological work as acid solutions of their hydrochloric acid salts. Since such compounds are salts of relatively strong bases, their solutions are not readily susceptible to loss of desired activity because of alkaline hydrolysis. Generally speaking, the salts made by the process of the present invention and the pharmaceutical derivatives made from these salts have marked stability to alkali and alkaline media. For example, the hydrazinium chlorides made by the present process can be recovered unchanged from media of caustic soda alkalinity. This single major advantage is actually two fold, since (1) it means that the pharmaceutical salts can be used as such in alkaline physiological fluids without precipitation and (2) these salts can be compounded into pharmaceutical formulations which are alkaline in nature without fear of precipitation caused by incompatibility.

The quarternized hydrazine derivatives have an additional desirable pharmacological property, cholinergic or anticholinergic effects on the nervous system, according to the nature of the substituents. Pharmaceutical utility does not imply complete equivalence between substituent groups. Even when the same psychological effect is produced by structurally different hydrazinium compounds, they are not usually equivalent because of marked differences in therapeutic dose range, tolerability range and extent of concomitant effects and ease of compounding and availability; to mention a few of the variable factors. For example, aralkyl esters of

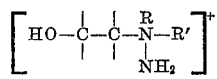

will show greater anti-spasmodic action in general than straight aryl or alkyl esters.

Compounds prepared by the method of the present invention are also useful as novel detergents, e.g.

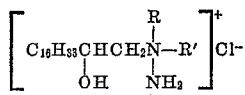

bacteriocides, softeners, antistatic agents, emulsifiers and polymer ingredients. Certain others make excellent intermediates for the preparation of novel polymers. Thus I have discovered that acylation of dialcohols prepared by my reaction with dibasic acids or their equally functioning derivatives (acid chlorides, anhydrides, etc.) yield new types of polyelectrolytes:

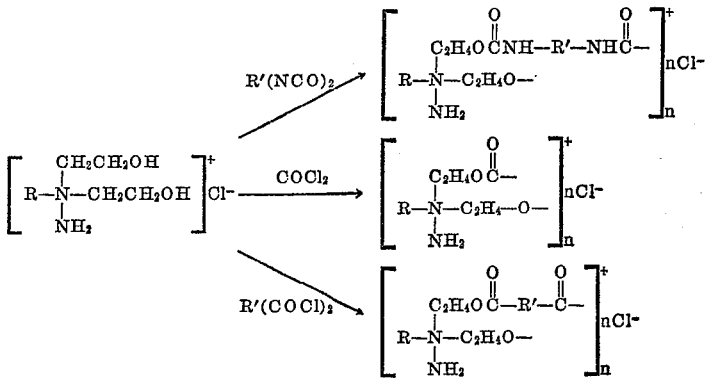

Such products show marked promise as anti-oxidants, flocculants, anti-static agents, and textile "animalizers."

I claim:

1. A process according to claim 7 wherein the oxirane is introduced into the reaction mixture in the vapor phase.

2. A process according to claim 1 wherein the molar ratio of oxirane to hydrazine is less than 1.

3. A process according to claim 2 wherein the reaction temperature is maintained between 10 and 80° C.

4. A process according to claim 7 wherein the reaction is conducted under substantially anhydrous conditions.

5. A process according to claim 4 wherein the reaction temperature is maintained between 50-200° C.

6. A process according to claim 7 wherein the reaction is conducted in the medium of an alcoholic solvent.

7. A process for preparing 1,1,1-trisubstituted hydrazinium salts of the general formula:

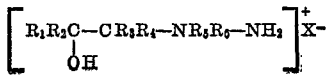

wherein $R_1$, $R_2$, $R_3$ and $R_4$ are independently selected from the group consisting of hydrogen and alkyl, hydroxyalkyl, cycloalkyl aryl and aralkyl radicals; $R_1$ and $R_4$, taken together, to form a carbocyclic ring structure; $R_5$ and $R_6$, taken separately, are members of the group consisting of lower alkyl, phenyl lower alkyl and hydroxy lower alkyl radicals; $R_5$ and $R_6$, taken together with the nitrogen on which they are both substituents, form a heterocyclic ring structure selected from the group consisting of morpholine, piperidine, piperazine and pyrrolidine; and X is an anion selected from the group consisting of chloride, bromide, iodide, sulfate, phosphate, nitrate, benzenesulfonate, monomethyl sulfate and monphenyl phosphate; said process comprises subjecting a hydrazine salt of the general formula $R_5R_6N-NH_2 \cdot HX$ to the action of an oxirane of the general formula

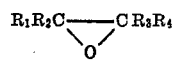

and separating the said 1,1,1-trisubstituted hydrazinium salt thus formed from the reaction mixture.

8. A process according to claim 7 wherein $R_1$, $R_2$, $R_3$ and $R_4$ are hydrogen, $R_5$ and $R_6$ are lower alkyl and X is chloride.

9. A process according to claim 7 wherein $R_1$ is aryl, $R_2$, $R_3$ and $R_4$ are hydrogen, $R_5$ is phenyl lower alkyl, $R_6$ is lower alkyl and X is chloride.

10. A process according to claim 7 wherein $R_1$, $R_2$, $R_3$ and $R_4$ are hydrogen, $R_5$ is hydroxy lower alkyl, $R_6$ is lower alkyl and X is sulfate.

11. A process according to claim 7 wherein $R_1$ is hydroxyalkyl, $R_2$, $R_3$, and $R_4$ are hydrogen, $R_5$ and $R_6$ together with the nitrogen on which they are both substituents form a piperidine ring and X is chloride.

12. A process according to claim 7 wherein $R_1$ and $R_2$ are hydrogen, $R_3$ and $R_4$ are alkyl, $R_5$ and $R_6$ are lower alkyl and X is chloride.

References Cited in the file of this patent

UNITED STATES PATENTS 2,660,607   Gever _____ Nov. 24, 1953

OTHER REFERENCES

Almirante et al.: Ann. Chim. (Rome), vol. 42, pp. 645-50 (1952), Abstract from Chem. Abstracts, 47, 12289h.

Byrkit et al.: Industrial Engineering Chemistry, vol. 42, pp. 1862-75.

UNITED STATES PATENT OFFICE
Certificate of Correction

Patent No. 2,953,570                                                         September 20, 1960

Bernard Rudner

It is hereby certified that error appears in the above numbered patent requiring correction and that the said Letters Patent should read as corrected below.

Column 3, lines 23 to 26, the formula should appear as shown below instead of as in the patent:

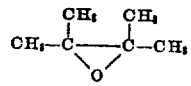

column 14, lines 33 to 38, the cation should be shown with a double positive charge and the anion should be shown as 2Cl⁻; same column 14, lines 45 to 51, the cation should be shown with a double positive charge and the anion should be shown as 2nCl⁻; column 15, lines 25 to 29, the cation should be shown with a double positive charge and the anion should be shown as 2Cl⁻; columns 15 and 16, lines 51 to 59, the structural formula should appear as shown below instead of as in the patent:

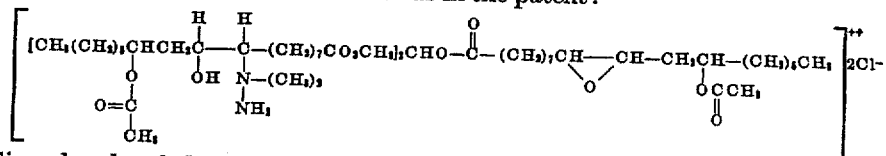

Signed and sealed this 8th day of May 1962.

[SEAL]

Attest:
ERNEST W. SWIDER,
*Attesting Officer.*

DAVID L. LADD,
*Commissioner of Patents.*